United States Patent [19]
Heikes et al.

[11] Patent Number: 5,390,134
[45] Date of Patent: Feb. 14, 1995

[54] SYSTEM AND METHOD FOR REDUCING LATENCY IN A FLOATING POINT PROCESSOR

[75] Inventors: Craig Heikes, Ft. Collins; Robert H. Miller, Jr., Loveland, both of Colo.

[73] Assignee: Hewlett-Packard Company, Palo Alto, Calif.

[21] Appl. No.: 11,447

[22] Filed: Jan. 29, 1993

[51] Int. Cl.⁶ ............................................. G06F 7/50
[52] U.S. Cl. .................................. 364/745; 364/748
[58] Field of Search .............. 364/745, 748, 715.04, 364/788

[56] References Cited

U.S. PATENT DOCUMENTS

| | | | |
|---|---|---|---|
| 4,562,553 | 12/1985 | Mattedi et al. | 364/745 |
| 4,648,058 | 3/1987 | Masumoto | 364/745 |
| 4,926,370 | 5/1990 | Brown et al. | 364/745 |
| 5,204,832 | 4/1993 | Nakakura | 364/745 |
| 5,241,490 | 8/1993 | Poon | 364/715.04 |

OTHER PUBLICATIONS

"IEEE Standard for Binary Floating-Point Arithmetic," Aug. 12, 1985, pp. 7-10.
J. T. Coonen, "An Implementation Guide to a Proposed Standard for Floating Point Arithmetic," IEEE Computer, pp. 68-78, Jan. 1980.
S. Waser & M. J. Flynn, "Introduction to Arithmetic for Digital Systems Designers," pp. 106-107, 123-124, 206-208, 1st Edition, 1982.

Primary Examiner—David M. Malzahn

[57] ABSTRACT

A rounding means is associated with a carry propagate adder of a floating point processor in order to reduce latency and enhance performance. The rounding mechanism performs a rounding function approximately simultaneously with an addition function performed by the carry propagate adder on fraction inputs FA, FB to ultimately derive a resultant fraction FR, thereby eliminating the need for a conventional post-normalize incrementer. The rounding mechanism has a carry select adder and rounding logic network. The rounding logic network communicates with the carry propagate adder and the carry select adder in order to provide rounding information to the carry select adder. The carry select adder and the rounding logic network jointly provide a rounded output, which is then normalized by the normalizer to thereby derive the resultant fraction.

18 Claims, 4 Drawing Sheets

SYSTEM AND METHOD FOR REDUCING LATENCY IN A FLOATING POINT PROCESSOR

FIELD OF THE INVENTION

The present invention generally relates to processors for performing floating point arithmetic, and more particularly, to a system and method for reducing latency in a floating point processor by optimizing the requisite rounding operation.

BACKGROUND OF THE INVENTION

Floating point processors enhance the performance of arithmetic computations within a computer by serving a dedicated purpose directed to performing mathematical operations on numbers with large mathematical ranges. Numbers are expressed and stored in a storage format 5, shown in FIG. 1, having a sign field 5a, an exponent field 5b, and a fraction field 5c (also known as, mantissa field). Generally, as shown in both the exponent and fraction fields 5b, 5c, the binary bits run left to right from the most significant bit (msb) to the least significant bit (lsb). In the early days of floating point processor development, floating point processors were implemented with numerous discrete electronic logic elements on separate cumbersome circuit boards within a computer. In the mid 1980's as development progressed and became more sophisticated, floating point processors were placed on separate microchips, or co-processors, configured to be interfaced to and generally adjacent a microprocessor of the computer. Finally, at present, floating point processors are being implemented within microprocessors themselves, resulting in a need to further substantially enhance the performance and latency requirements of circuits which provide floating point functionality.

Rounding in a floating point processor is considered a complex logic problem. It involves eliminating data bits of lost precision. Data bits of lost precision are those additional bits which are generated during floating point operations and which must be eliminated so that the floating point processor can output a result in the proper storage format. Moreover, rounding may be performed using a wide variety of methodologies. In this regard, see "IEEE Standard for Binary Floating Point Arithmetic," Aug. 12, 1985, which sets forth the American National Standard (ANSI/IEEE Std. 754-1985) for binary floating point arithmetic. See also J. T. Coonen, "An Implementation Guide to a Proposed Standard for Floating Point Arithmetic," IEEE Computer, pp. 68–78, January 1980. The American National Standard requires at least the following rounding schemes within a floating point processor: (1) round-to-nearest, (2) round-toward-positive-infinity ($+\infty$), (3) round-toward-negative-infinity ($-\infty$), and (4) round-toward-zero. Briefly described, in scheme 1, any number having a lost precision which is greater than $\frac{1}{2}$ of a least significant bit, or "$\frac{1}{2}$ lsb," is rounded up; any number having a lost precision which is less than $\frac{1}{2}$ lsb is rounded down; and any number having a lost precision which is exactly equal to $\frac{1}{2}$ lsb is rounded either up or down in order to ultimately achieve an even number (i.e., ending in zero). In scheme 2, a number is always rounded toward positive infinity, i.e., up if a positive number and down if a negative number. In scheme 3, a number is always rounded toward negative infinity, i.e., up if a negative number and down if a positive number. Finally, in scheme 4, a number is truncated.

The American National Standard further defines four particular floating point formats. A single format comprises one sign bit, eight exponent bits, and twenty-three fraction bits. A double format comprises one sign bit, eleven exponent bits, and fifty-two fraction bits. Further, both the single and double formats can be extended. In the single extended format, there is one sign bit, at least eleven exponent bits, and at least forty-three fraction bits. Finally, in the double extended format, there are one sign bit, at least fifteen exponent bits, and at least seventy-nine fraction bits.

The basic architecture for a floating point processor 11 is illustrated in FIG. 2. Binary floating point inputs A, B, denoted by reference numerals 12, 14, respectively, are mathematically combined by the floating point processor 11 in order to provide a resultant binary floating point output R, denoted by reference numeral 16. Floating point operations can be in the form of unary operations where only one binary number is operated upon or in the form of binary operations where two binary numbers are mathematically combined. For instance, a unary operation would be a square root operation, a cosine operation, or a conversion from one floating point format to another. Examples of binary operations include addition, subtraction, multiplication, and division. When the floating point processor 11 performs a unary operation on a single floating point number, the floating point number is input as one of the floating point inputs A, B while the other floating point input B, A is set to a constant, such as zero.

The floating point processor 11 comprises sign logic 18, exponent logic 22, and significand logic 24. The significand logic 24 takes the fractions FA, FB and converts them to respective significand formats, which are operated upon by the processor 11. A significand format 6 is illustrated in FIG. 1. As shown, the significand format includes not only the fraction field, but also hidden bits (bits V, N) to the left of the binary point and several lost precision bits (bits G, R, S) to the right of the fraction's lsb (bit L). As shown in FIG. 1, the V, N, Q, L, G, R, S bits are denoted by respective reference numerals 6a–6g. The Q, L bits 6c, 6d are successive lsb's of the fraction 5c. The N bit 6b is an additional msb of the fraction 5c. The V bit 6a is a carry out from the N bit 6b. The G bit 6e is known as a guard bit. The R bit 6f is known as a round bit. Finally, the S bit 6g is known as a sticky bit.

Significant to the discussion in this document, the significand logic 24 comprises a carry propagate adder 26 followed by a post normalizer 27 which includes an incrementer 28 for operating on the fractions FA 12' and FB 14' to derive a resultant fraction FR 16'. In general, the normalizer 27 is disposed for shifting and rounding digits in the result which is output by the adder 26. Shifting digits is necessary to preserve a proper fractional part. Moreover, the incrementer 28 is disposed for incrementing, or adding a logic high ("1" in Boolean logic), if necessary during the rounding process.

A specific example of a floating point processor utilizing an incrementer is described in S. Waser and M. J. Flynn, *Introduction to Arithmetic for Digital Systems Designers*, pp. 106–107, 123–124, 206–208, 1st Edition, 1982, which description is incorporated herein by reference as if set forth in full hereinbelow. In the floating point processor disclosed in the foregoing textbook, a dedicated circuit and algorithm is used for performing both addition and subtraction, while another dedicated circuit and algorithm is used for performing both multiplication and division.

As mentioned, the incrementer 28 increments the significand if necessary during the rounding process. In order to increment a binary number, a carry propagation must occur across the entire width of the corresponding significand. Such an operation undesirably adds significant delay to the overall operation of the floating point processor. Thus, the use of an incrementer in a floating point processor solves the complex logic problem of rounding at the expense of performance and latency.

SUMMARY OF THE INVENTION

Accordingly, an object of the present invention is to overcome the deficiencies and inadequacies of the prior art as noted above.

Another object of the present invention is to provide a system and method for minimizing latency and enhancing performance in a floating point processor.

Another object of the present invention is to provide a system and method for optimizing rounding in a floating point processor.

Another object of the present invention is to provide a system and method for rounding in a floating point processor which eliminate the need for an incrementer within the significand logic of the floating point processor.

Another object of the present invention is to provide a system and method for implementing rounding operations in a floating point processor prior to normalization of the floating point result.

Another object of the present invention is to provide a system and method for a floating point processor for performing any type of rounding operation, including but not limited to, those rounding operations defined in the American National Standard (ANSI/IEEE 754-1985).

Another object of the present invention is to provide a system for rounding in a floating point processor which is simple in design, inexpensive to implement, and efficient as well as reliable in operation.

Another object of the present invention is to provide a system and method for rounding in a floating point processor which can be implemented with any floating point format.

Another object of the present invention is to provide a system and method for rounding in a floating point processor which utilizes any family of logic, including but not limited to, static logic and dynamic logic.

Another object of the present invention is to provide a system and method for rounding in a floating point processor which uses mousetrap logic, which is self-timed dynamic logic.

The present invention is a system and method for reducing latency in a floating point processor by optimizing the requisite rounding operation. The rounding optimization permits elimination of an incrementer, which has traditionally added substantial latency to floating point operations. In accordance with the present invention, a rounding means is associated with the carry propagate adder of a floating point processor. The rounding means performs a rounding function as the addition function is performed by the carry propagate adder. Thus, the primary floating point summation is performed approximately simultaneously with the round function, thereby eliminating the need for an incrementer and minimizing latency.

The rounding means may be implemented with a carry select adder and a simple combinational rounding logic network. The rounding logic network communicates with the carry propagate adder and the carry select adder in order to provide rounding information to the carry select adder. The carry select adder and the rounding logic network jointly provide a rounded output, which can then be normalized by a normalizer.

In accordance with another feature of the present invention, a novel method is implemented when performing a round-to-nearest rounding process in the novel rounding means. The method involves the following procedure: (i) rounding the result up if the lost precision of the result is greater than ½ lsb; (ii) rounding the result down if the lost precision of the result is less than ½ lsb; (iii) normalizing the rounded result to derive a post-normalized result; and (iv) after normalization, forcing the post-normalized result to an even number, if the result, before normalization, had a lost precision equal to ½ lsb.

Other objects, features, and advantages of the present invention will become apparent from the following specification when read in conjunction with the accompanying drawings.

BRIEF DESCRIPTION OF THE DRAWINGS

The present invention, as defined in the claims, can be better understood with reference to the following drawings:

DETAILED DESCRIPTION OF THE PREFERRED EMBODIMENT

Figure 2:
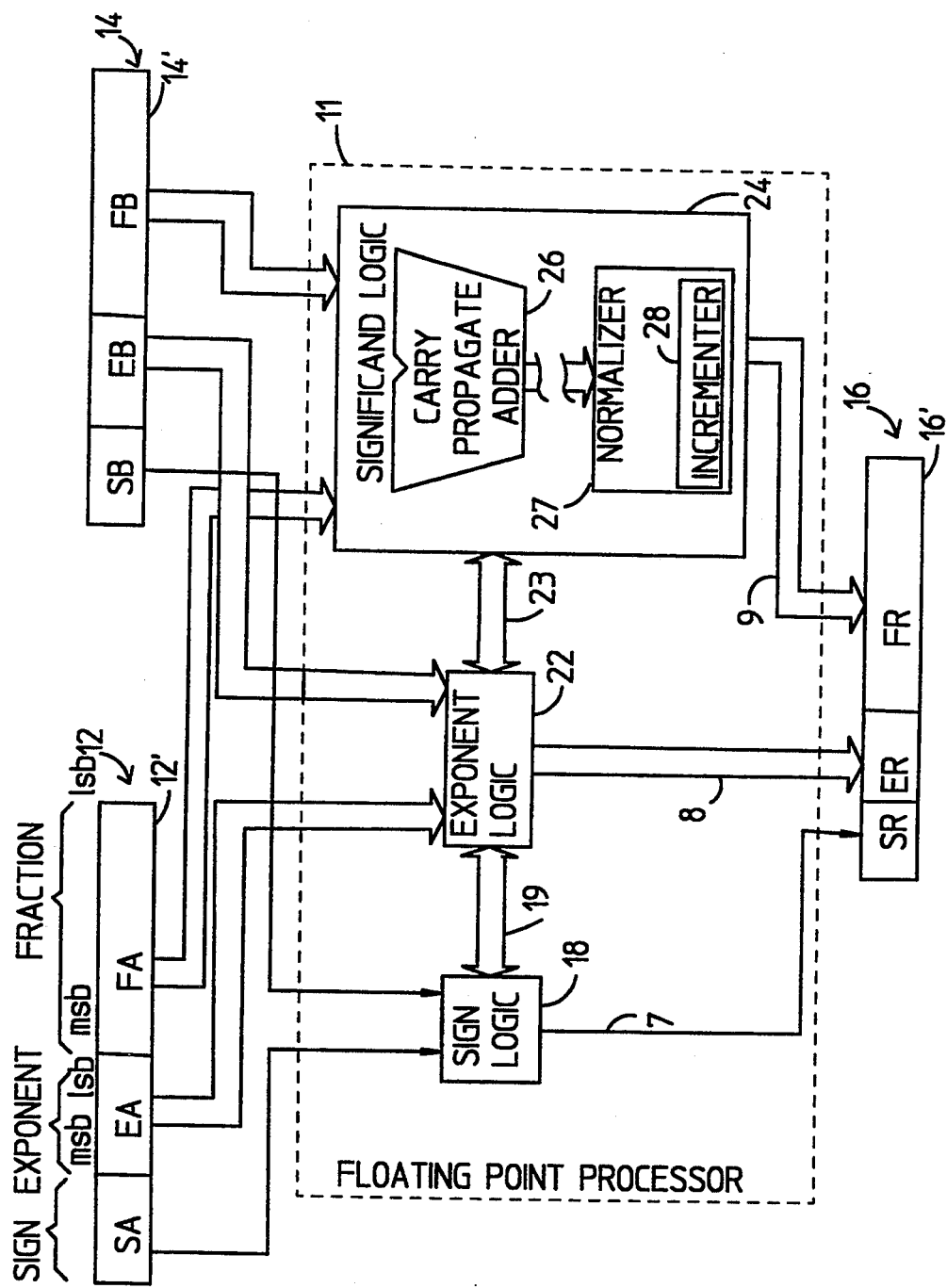
FIG. 2 is a block diagram of a floating point processor of the prior art.
Figure 3:
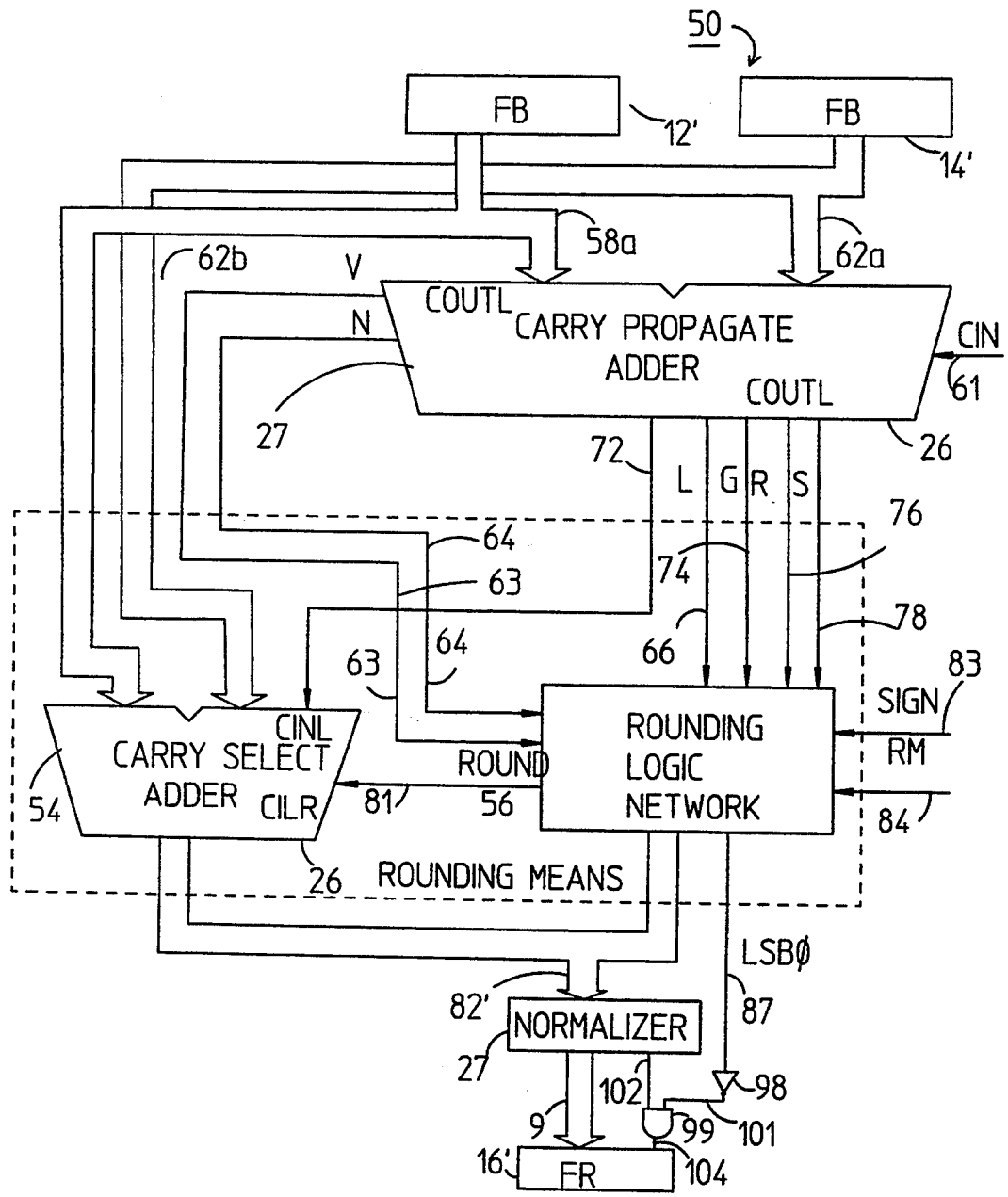
FIG. 3 is a block diagram of the present invention.

Referring now in more detail to the drawings wherein like numerals represent corresponding parts throughout the several views, FIG. 3 shows a novel system 50 for implementing high performance rounding in the floating point processor 11 of FIG. 2. The novel system 50 of FIG. 3 is employed within the significand logic 24 of the floating point processor 11 of FIG. 2 so as to perform a rounding function approximately simultaneously with the add function of the carry propagate adder 26. In other words, a fraction FA 12' and a fraction FB 14' are mathematically combined and rounded concurrently to generate a resultant fraction FR 16'.

As illustrated in FIG. 3, the novel system 50 has a rounding means 52 associated with the carry propagate adder 26 for the purpose of rounding approximately simultaneously with the addition function performed by the carry propagate adder 26, and prior to normalization by the normalizer 27. In the preferred embodiment, the rounding means 52 has a carry select adder 54 and rounding logic network 56. The carry select adder 54 is well known in the art. In essence, the carry select adder 54 performs the same functionality as the carry propagate adder 26; however, unlike the carry propagate adder 26, the carry select adder 54 is organized to be able to deliver its result quickly when the carry-in CINR is known late in time.

The carry propagate adder 26 can be any carry propagate adder, for example, but not limited to, a well known high performance LING adder, a carry look-ahead adder, or a ripple carry adder. For a discussion of conventional carry propagate adders which are suitable for the present invention, refer to Kai Hwang, *Computer Arithmetic Principles, Architecture And Design*, pp. 69–96, 1st Edition 1979, and to J. F. Cavanagh, *Digital Computer Arithmetic Design & Implementation*, pp. 98–124, 1984. The foregoing discussions are incorporated herein by reference.

In the preferred embodiment, the carry propagate adder 26 is a 56-bit adder. The carry propagate adder 26 receives two 56-bit mantissas MA, MB denoted by respective reference numerals 12', 14' and a carry in CIN bit 61, and computes therefrom a 56-bit significand SUM with an associated carry out COUTN bit, or a V bit 63. The foregoing can be expressed in hardware description language (HDL) as follows:

{COUTN, SUM [55:0]} = MA[55:0] + MB[55:0] + CIN The CIN bit 61 is typically used as a control input for specifying the arithmetic operation to be performed by the carry propagate adder 26. For instance, an addition operation might be specified when the CIN bit 61 exhibits a logic low ("0" in Boolean logic), while a subtraction operation might be specified when the CIN bit 61 exhibits a logic high ("1" in Boolean logic). Furthermore, as will be further discussed in detail later in this document, only a few of the output bits COUTN, SUM [55:0] are utilized to implement the present invention. The relevant output bits are the following: the V bit 63 (also, COUTN bit), an N bit 64 (msb; SUM [55]), an L bit 66 (lsb; SUM [3]), a carry out COUTL bit 72 from the L bit 66, a G bit 74 (a.k.a. a guard bit; SUM [2]), an R bit 76 (a.k.a. a round bit; SUM [1]), and an S bit 78 (a.k.a. a sticky bit; SUM [0]).

The carry select adder 54 can be any conventional carry select adder. Suitable carry select adders are described in Kai Hwang, *Computer Arithmetic Principles, Architecture And Design*, pp. 81–84, 1st Edition 1979, the discussion of which is incorporated herein by reference. Preferably, the carry select adder 54 is a 52-bit adder having an additional input CINL 72. In HDL, the carry select adder 54 performs the following equation: SUM [52:0] = MA [51:0] + MB [51:0] + CINL + CINR. The input CINL 72 is connected to the carry output COUTL bit 72 from the carry propagate adder 26. The carry select adder 54 receives MA [55:4] and MB [55:4] concurrently with the carry propagate adder 26. Further, the carry select adder 54 receives a carry select input CINR 81 from the rounding logic network 56. The input CINL 72 should be known when the fraction inputs FA, FB denoted by respective reference numerals 12', 14' are known. The input carry select CINR 81 can arrive late in time and select the SUM 82 of the carry select adder 54.

Figure 4:
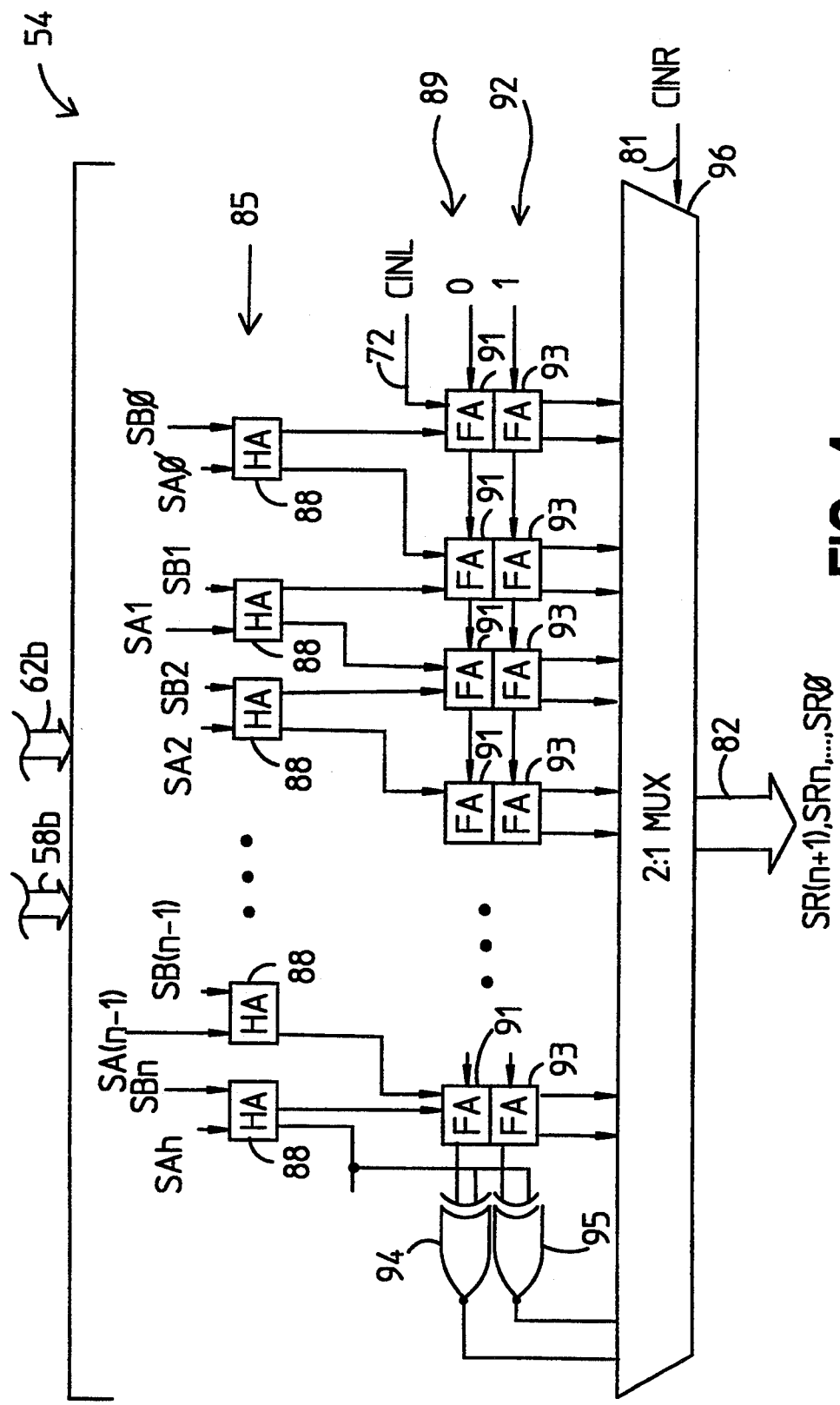
FIG. 4 is a block diagram of an example of a carry select adder of FIG. 3.

The input CINL 72 can be combined into the SUM 82 using any of numerous conventional techniques and architectures. Preferably, in the present invention, the input CINL 72 is combined into the SUM 82 via the use of a row 85 of half adders (HA) 88 in a well known carry save configuration, as is indicated in an example of a carry select adder shown in FIG. 4. As illustrated in FIG. 4, the binary values of the n bits of the respective significands SA, SB are first combined via the half adders 88. In this regard, the bits SA0-SAn of significand SA are added to the corresponding bits SB0-SBn of significand SB. Then, in a row 89 of full adders (FA) 91, the CINL bit 72 is combined with the result from the row 85 of half adders 88. Importantly, in order to provide for the situation where the CINR bit 81 can be known late, a carry-in logic low ("0") as well as a carry-in logic high ("1") are both independently added to the result of the addition operations, via respective full adder rows 89, 92, in order to derive two potential final results which are sent to a two-to-one (2:1) multiplexer (MUX) 96. The CINR bit 81, which may be known late, selects the correct significand result SR(n+1), SRn, . . . , SR0. In other words, the CINR bit 81 selects either the result having a logic low added to it or the result having a logic high added to it.

The rounding logic network 56 comprises combinational logic which receives the V bit 63, the N bit 64, the L bit 66, the G bit 74, the R bit 76, the S bit 78, a sign bit 83 from the sign logic 18 indicating the ultimate sign of the resultant fraction FR 16' based upon fraction inputs FA, FB, and a rounding mode input RM 84 which is preselected by the user and which specifies any suitable rounding method, including but not limited to, the four rounding methodologies set forth in the American National Standard (ANSI/IEEE Std. 754-1985). The rounding logic network 56 computes and outputs the CINR bit 81 for the carry select adder 54, the lower four lsb bits SUM [3:0] 86 of the resultant fraction FR 16', and an LSB0 signal 87 which is used after normalization for a novel round-to-nearest rounding process, which is described in further detail hereinbelow. The rounding logic network 56 can be optimized so that only one gate delay exists between receipt of both the V bit 63 and the N bit 64 and the ultimate generation of the CINR bit 81. A possible implementation for the combinational logic for the rounding logic network 56 is set forth in HDL in the Appendix of this document.

The rounding logic network 56 has three regions of operation, which are determined by the logic values of the hidden V, N bits 63, 64. Each of the three regions corresponds to a particular magnitude of the resultant fraction FR 16' and corresponds to the normalizing operation which will occur in the normalizer 27. In other words, it is necessary to know the position of the lsb of the post normalized output 9 before rounding can be accomplished. Table A below shows these three regions.

TABLE A

| Region | Significand (S) | V Bit | N Bit | Normalize Operation |
|---|---|---|---|---|
| 1 | S < 1 | 0 | 0 | left shift |
| 2 | 1 ≦ S < 2 | 0 | 1 | no shift |
| 3 | 2 ≦ S < 4 | 1 | X | right shift |

When operating in region 1 of Table A, the normalize operation in the normalizer 27 requires a left shift (toward significand msb) of one or more bits depending on the position of the first leading logic high in the significand. For example, suppose it is necessary to shift the significand by one bit. In this case, the value of the G bit 74 becomes a precision bit and is output after normalization as the lsb (SUM [0]) of the post-normalized result 9, while the values of the lower bits R, S are discarded as lost precision. Further, in the event that there is a left shift of four or more bits, logic lows are shifted into the fraction after all of the lost precision bit values are used up. As an example, consider the scenario where the S bit is shifted to the Q bit position. In this case, a logic low is shifted into the L bit position.

When operating in region 2 of Table A, there is no normalize shift after the add operation and the rounding is into the L bit 66. Thus, the L bit 66 is output after normalization as the lsb (SUM [0]) of the post normalized result 9 and the values of the G, R, S bits are discarded as lost precision.

Figure 1:
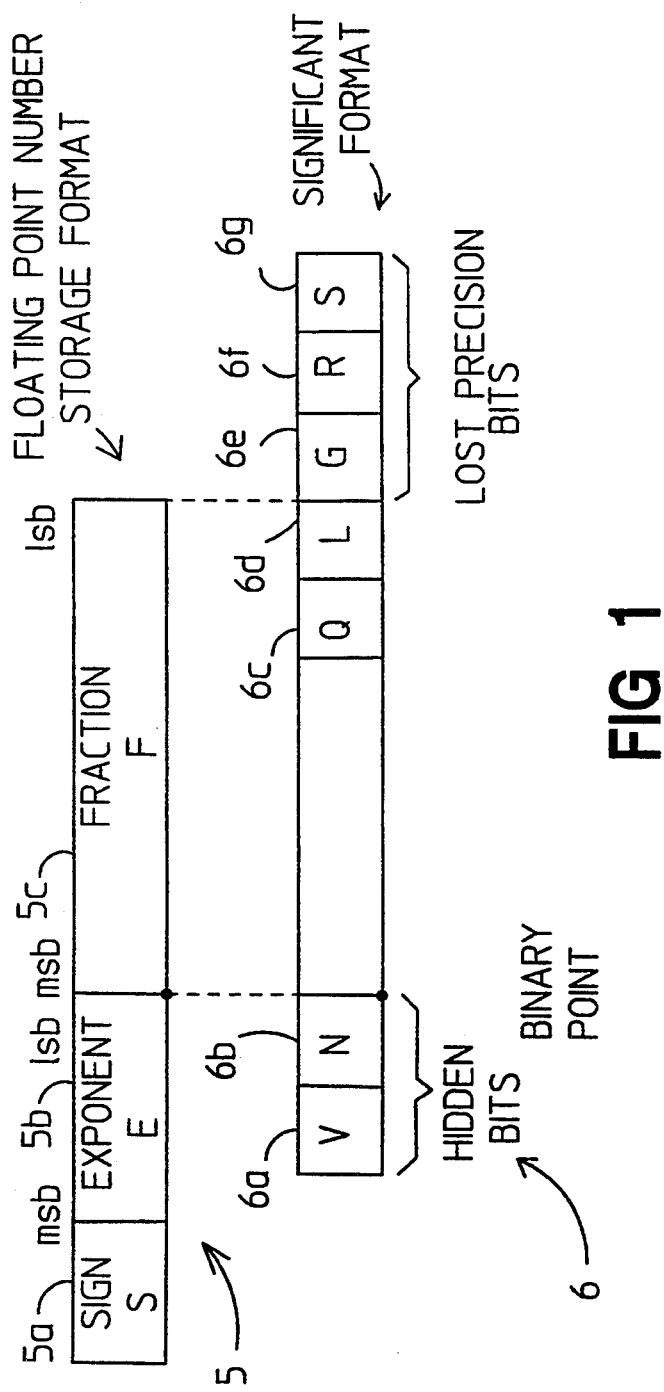
FIG. 1 is a schematic diagram illustrating the relationship between a floating point number storage format and a significand format which is operated upon by a floating point processor.

Finally, when operating in region 3 of Table A, the normalize operation requires a right shift (toward significand lsb) of only one bit. In this case, it is necessary to round into the Q bit (see FIG. 1), which is just left of the L bit 66, and to discard the value of the L bit 66 as lost precision. Thus, the Q bit is output after normalization as the lsb (SUM [0]) of the post-normalized result 9.

In accordance with another aspect of the present invention, a novel technique is utilized for simplifying and optimizing the conventional round-to-nearest rounding process. The conventional round-to-nearest rounding process can be explained as follows: any number with lost precision less than ½ lsb is rounded down; any number with lost precision greater than ½ lsb is rounded up; and Finally, any number with lost precision equal to ½ lsb is rounded to an even number.

In binary logic, conventional round-to-nearest rounding takes the following form. If the G bit 74 is at a logic low (i.e., lost precision <½ lsb), then the result is rounded down; if the G bit 74 is at a logic high and the R bit 76 or the S bit 78, or both, are at a logic high (i.e., lost precision >½ lsb), then the result is rounded up; and finally, if the G bit 74 is at a logic high and the R, S bits 76, 78 are both at a logic low (i.e., lost precision =½ lsb), then the result is rounded to an even number. In binary logic as well as the decimal number system, an even number is any number ending in a logic low, or zero.

In order to effectuate the round-to-nearest rounding process in the preferred embodiment of the present invention, the following simplified methodology is implemented. If the G bit 74 (first bit of lost precision) is at a logic high, then the result is always rounded up, and further, if the G bit 74 is at a logic low, then the result is always rounded down. Moreover, if the number originally comprised G,R,S = 1,0,0, or ½ lsb, and was thus rounded up, then as shown in FIG. 3 subsequent to normalization in the normalizer 27, the lsb (SUM [0]) of the resultant fraction FR 16' is forced to a logic low, thereby making the resultant fraction FR 16' an even number in accordance with the round-to-nearest rounding process. The lsb (SUM [0]) is forced to a logic low via the LSB0 signal 87 of FIG. 3, which passes through an inverter 98 and then an AND gate 99. The AND gate 99 combines a LSB0 101 with the post normalized lsb (SUM [0]) 102 of the resultant fraction FR 16' in order to derive the ultimate lsb (SUM [0]) 104 of the resultant FR 16'.

The present invention has significant performance advantages. Consider the preferred embodiment which was described above for purposes of discussion. In the preferred embodiment, only a mere 2 gate delays are required in addition to the carry propagate addition time in order to derive a significand which, after normalization, is the correctly rounded result. The present invention saves most of the gate delays attributable to the post normalize incrementer.

The features and principles of the present invention have been described and illustrated with reference to the preferred embodiment. It will be apparent to those skilled in the art that numerous modifications may be made to the preferred embodiment without departing from the spirit and scope of the present invention. All such modifications are intended to be incorporated within the scope of the present invention, as defined hereinafter in the claims.

APPENDIX

An example of a possible implementation for the logic in the rounding logic network 56 is set forth hereafter in conventional hardware description language (HDL).

```
// rounding mode
// RM = 00 is nearest even
// RM = 01 is to zero
// RM = 10 is positive infinity
// RM = 11 is negative infinity
// SIGN = 0 is a positive number
// SIGN = 1 is a negative number
module RL (V,N,L,R,G,S,SIGN,RM,SUM,ROUND,LSBO);
input V,N,L,G,R,S,SIGN;
input [1:0] RM;
output [3:0] SUM;
output ROUND, LSBO;
reg [3:0] SUM;
reg ROUND, LSBO;
reg l,g;
always @ (V or N or L or R or G or S or SIGN or RM) begin
case ({RM,V,N})
4'b0000:    begin ROUND=L&G&R; l=L  (R&G); g=G  R;
            LSBO=R&~S; end
4'b0001:    begin ROUND=L&G; l=L  G; g=G;
            LSBO=G&~(R|S); end
4'b0010:    begin ROUND=L; l=L; g=G;
            LSBO=L&~(G|R|S); end
4'b0011:    begin ROUND=L; l=L; g=G;
            LSBO=L&~(G|R|S); end
4'b0100:    begin ROUND=0; l=L; g=G;
            LSBO=0; end
4'b0101:    begin ROUND=0; l=L; g=G;
            LSBO=0; end
4'b0110:    begin ROUND=0; l=L; g=G;
            LSBO=0; end
4'b0111:    begin ROUND=0; l=L; g=G;
            LSBO=0; end
4'b1000:    begin ROUND=~SIGN & L & G & (R|S); l=L
            (~SIGN&G&(R|S)); g=G  (~SIGN&(R|S));
            LSBO=0; end
4'b1001:    begin ROUND=~SIGN & L & (G|R|S); l=L
            (~SIGN&(G|R|S)); g=G; LSBO=0; end
4'b1010:    begin ROUND=~SIGN & (L|G|R|S); l=L; g=G;
            LSBO=0; end
4'b1011:    begin ROUND=~SIGN & (L|G|R|S); l=L; g=G;
            LSBO=0; end
4'b1100:    begin ROUND= SIGN & L & G & (R|S); l=L
            (SIGN&G&(R|S)); g=G  (SIGN&(R|S));
            LSBO=0; end
4'b1101:    begin ROUND= SIGN & L & (G|R|S); l=L
            (SIGN&(G|R|S)); g=G; LSBO=0; end
4'b1110:    begin ROUND= SIGN & (L|G|R|S); l=L; g=G;
            LSBO=0; end
4'b1111:    begin ROUND= SIGN & (L|G|R|S); l=L; g=G;
            LSBO=0; end
endcase
SUM[3:0]={l,g,R,S};
end
endmodule
```

Wherefore, the following inventions are claimed:

1. In a floating point processor having a carry propagate adder, an improvement for enhancing performance by reducing latency comprising a rounding means connected to said carry propagate adder, said rounding means and said carry propagate adder for receiving first, second, third and fourth inputs, said rounding means for performing a rounding operation using the first and second inputs approximately simultaneously when an addition operation is performed on the third and fourth inputs by said carry propagate adder, said rounding means for providing a rounded output, said rounding means including:
- a carry select adder for adding the first and second inputs to generate a first preliminary result, and for generating second and third preliminary results by adding a logic "1" and a logic "0" to the first preliminary result;
- a rounding logic network communicating with said carry propagate adder and said carry select adder, generating an input carry select signal to select one of the second and third preliminary results; and
- said carry select adder and said rounding logic network for jointly providing the rounded output, based on the selected one of the second and third preliminary results.

2. The improvement of claim 1, further comprising a normalizer for normalizing said rounded output subsequent to said rounding operation in order to derive a post-normalized output.

3. The improvement of claim 2, further comprising logic means coupled to the rounding logic network, for determining a prospective normalize operation prior to said normalizing.

4. The improvement of claim 2, further comprising logic means for selectively forcing said post-normalized output to an even number when a lost precision of said rounded output equals ½ of a least significant bit.

5. In a floating point processor having a carry propagate adder, an improvement for enhancing performance by reducing latency comprising a rounding means connected to said carry propagate adder, said rounding means and said carry propagate adder for receiving inputs, said rounding means for performing a rounding operation approximately simultaneously when an addition operation is performed on the inputs by said carry propagate adder, said rounding means for providing a rounded output, said rounding means including
- a carry select adder;
- a rounding logic network communicating with said carry propagate adder and said carry select adder; and
- said carry select adder and said rounding logic network for jointly providing the rounded output.
- a normalizer for normalizing said rounded output subsequent to said rounding operation in order to derive a post-normalized output; and
- logic means for selectively forcing said post-normalized output to an even number when a lost precision of said rounded output equals ½ of a least significant bit, said logic means including:
  - an inverter for inverting a least significant bit of said rounded output to derive an inverter output, and
  - a logic gate for performing an AND logic operation, said logic gate for combining said inverter output with a least significant bit of said post-normalized output to derive an ultimate least significant bit of said post-normalized output.

6. A system receiving first, second, third and fourth inputs, for reducing latency in a floating point processor, the system comprising:
- a carry propagate adder for receiving the third and fourth inputs and for performing an addition function on the third and fourth inputs; and
- a rounding means connected to said carry propagate adder, said rounding means for receiving the first and second inputs and for performing a rounding function approximately concurrently with said addition function and for providing a rounded output.

said rounding means including:
- a carry select adder generating second and third preliminary results by adding a logic "1" and a logic "0", respectively, to the first preliminary result;
- a rounding logic network communicating with said carry propagate adder and said carry select adder, generating a carry select input signal to select one of the second and third preliminary results; and
- said carry select adder and said rounding logic network for jointly providing said rounded output, based on the selected one of the second and third preliminary results.

7. The system of claim 7, further comprising a normalizer for normalizing said rounded output subsequent to said rounding operation in order to derive a post-normalized output.

8. The system of claim 7, further comprising a logic means for selectively forcing said post-normalized output to an even number when said rounded output has a lost precision equal to ½ of a least significant bit.

9. A system for reducing latency in a floating point processor, comprising:
- a carry propagate adder for receiving inputs and for performing an addition function on the inputs; and
- a rounding means connected to said carry propagate adder, said rounding means for receiving the inputs and for performing a rounding function approximately concurrently with said addition function and for providing a rounded output.

said rounding means including:
- a carry select adder, and
- a rounding logic network communicating with said carry propagate adder and said carry select adder; and
- said carry select adder and said rounding logic network for jointly providing said rounded output;
- a normalizer for normalizing said rounded output subsequent to said rounding operation in order to derive a post-normalized output; and
- a logic means for selectively forcing said post-normalized output to an even number when said rounded output has a lost precision equal to ½ of a least significant bit, said logic means including
  - an inverter for inverting a least significant bit of said rounded output to derive an inverter output, and
  - a logic gate for performing an AND logic operation, said logic gate for combining said inverter output with a least significant bit of said post-normalized output to derive an ultimate least significant bit of said post-normalized output.

10. A method for enhancing performance in a floating point processor by reducing latency, the method using first, second, third and fourth inputs, the method comprising the steps of:
- performing addition on the third and fourth inputs using carry propagation to derive an addition result;
- rounding said addition result to derive a first part of a rounded output and a carry select input signal indicative of whether said rounding generates a carry, performing addition on the first and second inputs more significant than the third and fourth inputs, respectively, to generate a first preliminary result, said addition on the first and second inputs being performed approximately simultaneously with said step of rounding, adding a logic "1" and a logic "0" to the first preliminary result, to generate second and third preliminary results, respectively;

selecting one of the second and third preliminary results, based on the carry select input signal; and outputting the selected one of the second and third preliminary results as a second part of the rounded output.

11. The method of claim 10, further comprising the step of determining a prospective normalize operation prior to normalization of said result.

12. A method for enhancing performance in a floating point processor by reducing latency, the method comprising the steps of:

performing addition on inputs using carry propagation to derive a result, the result including successive bits of lost precision, said successive bits including first, second and third bits in order of significance;

rounding said result approximately simultaneously with said addition to derive a rounded output;

performing a round-to-nearest rounding process to derive a rounded result from said result;

rounding up if said first bit exhibits a logic high;

rounding down if said first bit exhibits a logic low;

normalizing said rounded result to derive a post-normalized result; and after normalization, forcing said post-normalized result to even, if prior to said normalization said first bit exhibited a logic high and both said second and third bits exhibited a logic low.

13. A method for enhancing performance in a floating point processor by reducing latency, the method comprising the steps of:

performing addition on inputs using carry propagation to derive a result, the result including successive bits of lost precision, said successive bits including first, second and third bits in order of significance;

rounding said result approximately simultaneously with said addition to derive a rounded output;

[The method of claim 12, further comprising the steps of:

performing a round-to-nearest rounding process to derive a rounded result from said result;

rounding up if said result has a lost precision greater than ½ of a least significant bit;

rounding down if said result has said lost precision of less than ½ of said least significant bit;

normalizing said rounded result to derive a post-normalized result; and after normalization, forcing said post-normalized result to an even number, if said result has a lost precision equal to ½ of said least significant bit prior to said normalization.

14. The method of claim 13, further comprising the step of performing said rounding prior to normalizing said result.

15. The method of claim 13, further comprising the step of determining a prospective normalize operation prior to said step of normalizing.

16. An apparatus receiving first and second mantissa data, the apparatus comprising:

a carry propagate adder including a first arithmetic logic unit, coupled to receive least significant parts of the first and second mantissa data, to arithmetically operate on the least significant parts of the first and second mantissa data with the first arithmetic logic unit, to generate an output including a carry output from the least significant bit;

a rounding logic network coupled to receive a part of the output of the carry propagate adder, including a combinational logic circuit to generate a least significant part of a rounded output and a carry select input signal indicative of whether the rounding logic network generates a carry in generating the least significant part of the rounded output; and a carry select adder including a second arithmetic logic unit, coupled to receive the most significant parts of the first and second mantissa data, coupled to the carry propagate adder to receive the carry output from the least significant bit, and coupled to the rounding logic network to receive the carry select input signal, generating a first preliminary result using the second arithmetic logic unit, based on the most significant parts of the first and second mantissa data and the carry output from the least significant bit, adding a logic "0" and a logic "1" to the first preliminary result to generate second and third preliminary results, and for outputting one of the second and third preliminary results as a most significant part of the rounded output, based on the carry select input signal.

17. An apparatus as claimed in claim 16, wherein one of a plurality of rounding modes can be selected with a rounding mode input supplied to the rounding logic network.

18. An apparatus as claimed in claim 17, wherein the plurality of rounding modes include rounding operations defined in American National Standard (ANSI/IEEE 754-1985).

* * * * *

UNITED STATES PATENT AND TRADEMARK OFFICE
CERTIFICATE OF CORRECTION

PATENT NO. : 5,390,134
DATED : Feb. 14, 1995
INVENTOR(S) : Craig Heikes et al.

It is certified that error appears in the above-identified patent and that said Letters Patent is hereby corrected as shown below:

Column 9, line 44, Claim5: Delete "." and insert therefor --;--;

Column 10, line 3 Claim 5: Delete "." and insert therefor --,--;

Column 10, line 18 Claim 7: Between claim and futher delete "7" and insert therefor --6--;

Column 10, line 34, Claim 9: Delete "." and insert therefor --,--.

Signed and Sealed this

Twenty-fourth Day of March, 1998

Attest:

BRUCE LEHMAN

*Attesting Officer*   *Commissioner of Patents and Trademarks*